United States Patent
Numazaki et al.

(10) Patent No.: US 8,723,980 B2
(45) Date of Patent: *May 13, 2014

(54) IMAGE PROCESSING SYSTEM AND IMAGE ACQUISITION METHOD

(75) Inventors: Shunichi Numazaki, Yokohama (JP); Miwako Doi, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,537

(22) Filed: Apr. 3, 2012

(65) Prior Publication Data

US 2012/0268607 A1    Oct. 25, 2012

Related U.S. Application Data

(62) Division of application No. 12/050,102, filed on Mar. 17, 2008, now Pat. No. 8,169,496.

(30) Foreign Application Priority Data

Mar. 29, 2007 (JP) ................................. 2007-087187

(51) Int. Cl.
 H04N 5/228  (2006.01)
 H04N 5/222  (2006.01)

(52) U.S. Cl.
 USPC ......................................... 348/222.1; 348/370

(58) Field of Classification Search
 CPC .. H04N 5/2256; H04N 5/2354; H04N 5/2352
 See application file for complete search history.

(56) References Cited

U.S. PATENT DOCUMENTS

| | | | |
|---|---|---|---|
| 4,967,276 A | * | 10/1990 | Murakami et al. ............ 348/164 |
| 6,144,366 A | | 11/2000 | Numazaki et al. |
| 6,292,169 B1 | | 9/2001 | Numazaki et al. |
| 6,369,796 B1 | | 4/2002 | Numazaki et al. |
| 6,661,453 B1 | | 12/2003 | Numazaki et al. |
| 6,900,790 B1 | | 5/2005 | Doi et al. |
| 7,531,781 B2 | * | 5/2009 | Sumi et al. ................. 250/208.1 |

(Continued)

FOREIGN PATENT DOCUMENTS

| | | | |
|---|---|---|---|
| JP | 07-154777 | * | 6/1995 |
| JP | 7-154777 A | | 6/1995 |

(Continued)

OTHER PUBLICATIONS

Official action for corresponding Japanese application No. 2007087187 dated Feb. 3, 2009 (with English translation).

*Primary Examiner* — Luong T Nguyen
(74) *Attorney, Agent, or Firm* — Ohlandt, Greeley, Ruggiero & Perle, L.L.P.

(57) ABSTRACT

An image processing system includes an illumination unit and an illumination control unit configured to adjust light emitted from the illumination unit so as to illuminate a limited area in a space, the system generates a timing signal for controlling emission/non-emission of light from the illumination unit, captures a first image of an imaging area including the limited area or part of the limited area based on the timing signal, the first image being taken from a position different from the illumination unit when the illumination unit emits light, captures a second image of the imaging area based on the timing signal, the second image being taken from the position when the illumination unit emits no light, and acquires a third image which is a difference image between the first image and the second image.

11 Claims, 10 Drawing Sheets

(56) References Cited

U.S. PATENT DOCUMENTS

| | | |
|---|---|---|
| 7,589,771 B2 * | 9/2009 | Hosaka et al. ................. 348/252 |
| 7,755,672 B2 | 7/2010 | Pertsel |
| 8,169,496 B2 * | 5/2012 | Numazaki et al. ......... 348/222.1 |
| 2002/0113882 A1 | 8/2002 | Pollard et al. |
| 2004/0056838 A1 | 3/2004 | Numazaki et al. |
| 2004/0196371 A1 * | 10/2004 | Kono et al. ................... 348/162 |
| 2005/0162385 A1 | 7/2005 | Doi et al. |
| 2005/0270413 A1 | 12/2005 | Hatano et al. |

FOREIGN PATENT DOCUMENTS

| | | |
|---|---|---|
| JP | 10149449 | 6/1998 |
| JP | 10228802 | 8/1998 |
| JP | 11134505 A | 5/1999 |
| JP | 11-316645 | 11/1999 |
| JP | 2000175176 A | 6/2000 |
| JP | 2005-175391 A | 6/2005 |
| JP | 2005-175392 A | 6/2005 |
| JP | 2006-134035 A | 5/2006 |

* cited by examiner

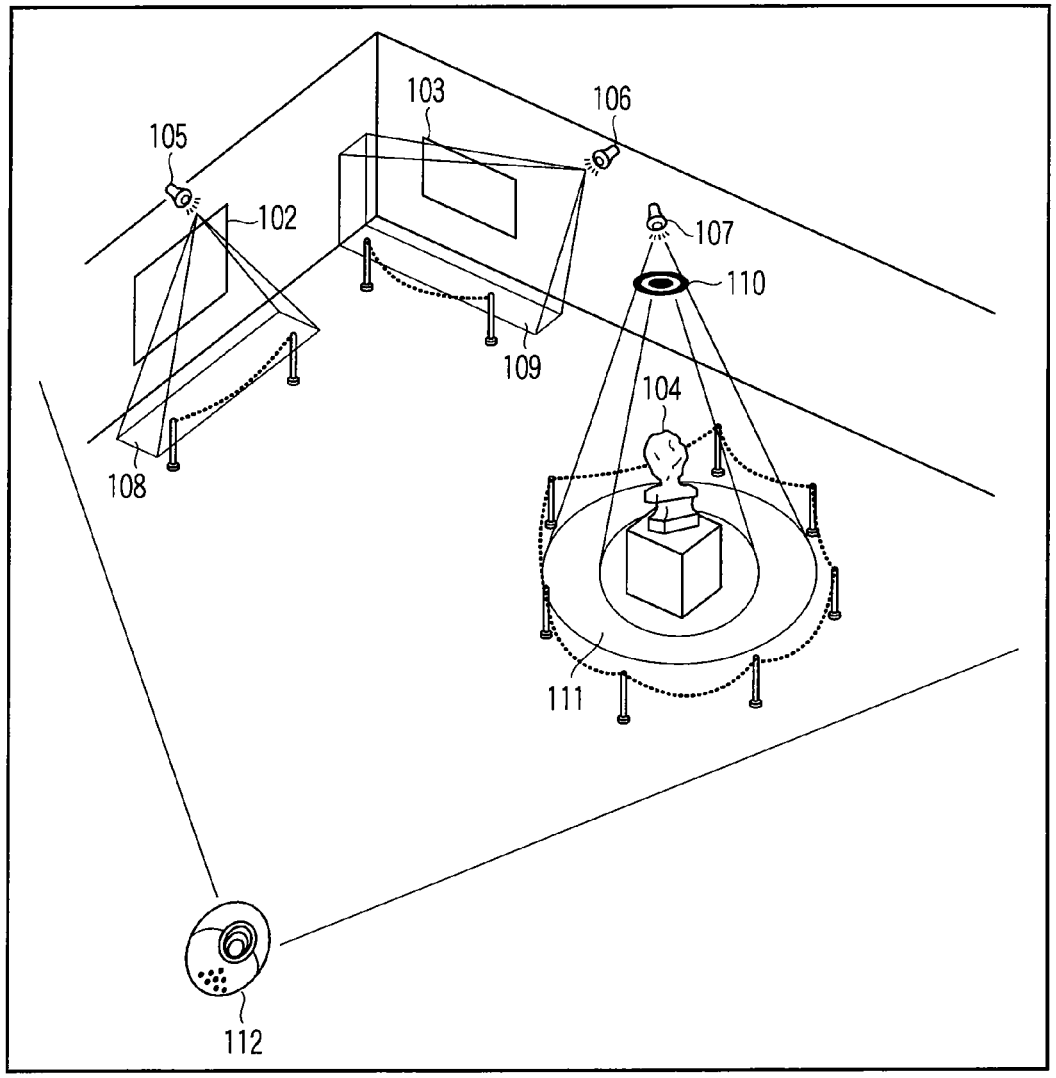
F I G. 3

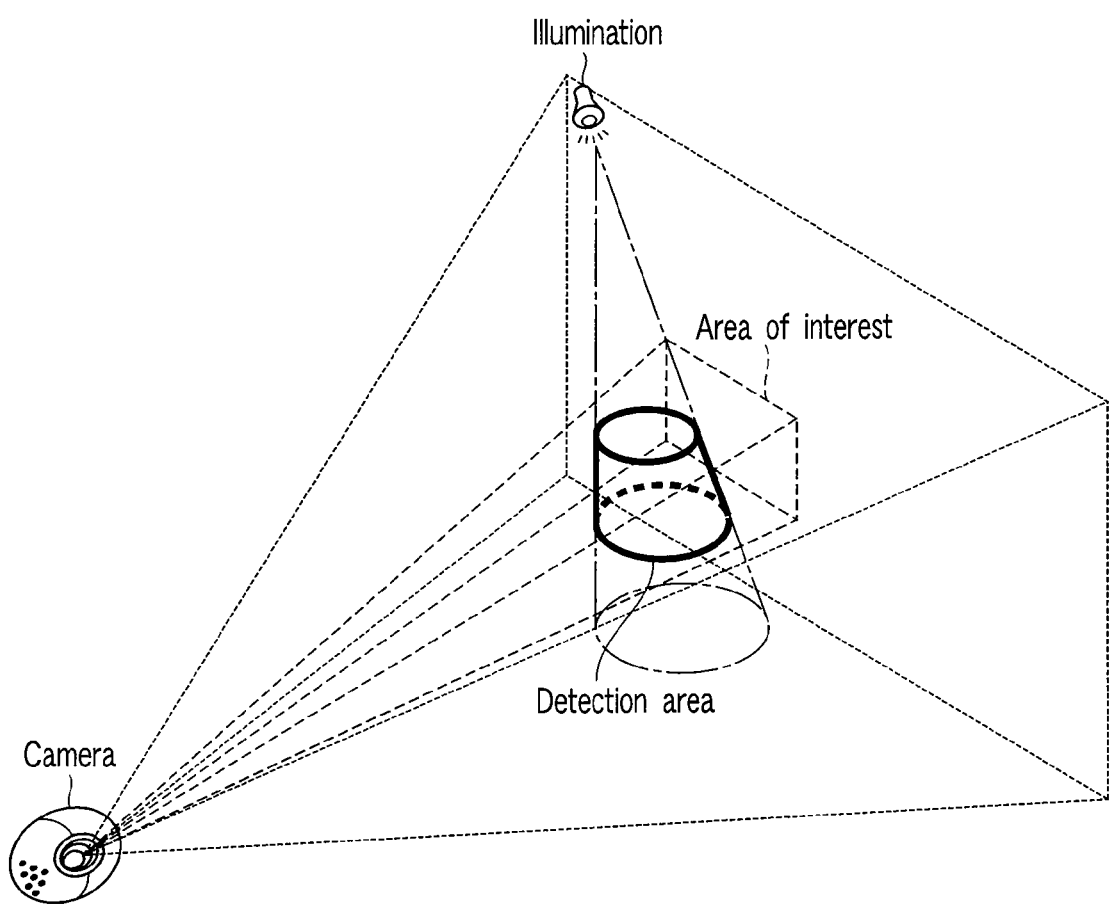
F I G. 13

IMAGE PROCESSING SYSTEM AND IMAGE ACQUISITION METHOD

CROSS-REFERENCE TO RELATED APPLICATIONS

This application is a division of U.S. application Ser. No. 12/050,102, filed Mar. 17, 2008, which issued as U.S. Pat. No. 8,169,496 on May 1, 2012 and is based upon and claims the benefit of priority from prior Japanese Patent Application No. 2007-087187, filed Mar. 29, 2007, the entire contents of each of which are incorporated herein by reference.

BACKGROUND OF THE INVENTION

1. Field of the Invention

The present invention relates to an image processing system and an image acquisition method.

2. Description of the Related Art

Surveillance cameras are used for the purpose of crime prevention and the like. In many cases, a generally used method is to install a plurality of cameras and cause an observer in an observation room or the like to make checks by watching the monitors. An alternative method is to record camera images in advance and check them when a problem arises.

In general, there are very many cameras which an observer monitors. It is therefore difficult to reliably observe whether something unusual has happened in images. For this reason, a system which provides some support is used. In such a support system, in order to check whether someone has entered a prohibited area, some kind of image processing is performed to recognize such entrance. It is easy to construct a system which sets a given observation area in an image and detects whether someone has entered the area. Such a system can only set an area within an image. However, this image actually covers a considerably wide range.

JP-A 2006-134035 (KOKAI) discloses a method of simultaneously acquiring distance images by using a stereo camera and setting a detection area on the basis of the distances. This makes it possible to set a narrower detection area.

The method disclosed in JP-A 2006-134035 (KOKAI) can set a narrow detection area, but requires a stereo camera, resulting in a very expensive system. This system also requires a high-performance processing apparatus for image processing. In addition, it is generally cumbersome to make adjustment for the installation of a stereo camera, and hence it is not easy to change a detection area.

BRIEF SUMMARY OF THE INVENTION

According to embodiments of the present invention there is provided an image processing system includes:
a timing signal generation unit configured to generate a timing signal;
a first illumination unit configured to emit light based on the timing signal;
an illumination control unit configured to adjust the light emitted from the first illumination unit so as to illuminate a limited area in a space;
a first capture unit configured to capture a first image of an imaging area including the limited area or part of the limited area based on the timing signal, the first image being taken from a position different from the first illumination unit when the first illumination unit emits light;
a second capture unit configured to capture a second image of the imaging area based on the timing signal, the second image being taken from the position when the first illumination unit emits no light; and
a difference image acquisition unit configured to acquire a third image which is a difference image between the first image and the second image.

BRIEF DESCRIPTION OF THE SEVERAL VIEWS OF THE DRAWING

FIG. 3 is a view for explaining an example of the placement of the illumination unit, illumination control unit, and image acquisition unit of the image processing system according to the embodiment;

FIG. 13 is a view for explaining how a detection area is limited; and

DETAILED DESCRIPTION OF THE INVENTION

First Embodiment

The following exemplifies a case in which the image processing system according to the first embodiment is installed as an image surveillance system in, for example, an art museum or a museum to detect the intrusion of persons into prohibited areas near exhibits.

Figure 1:
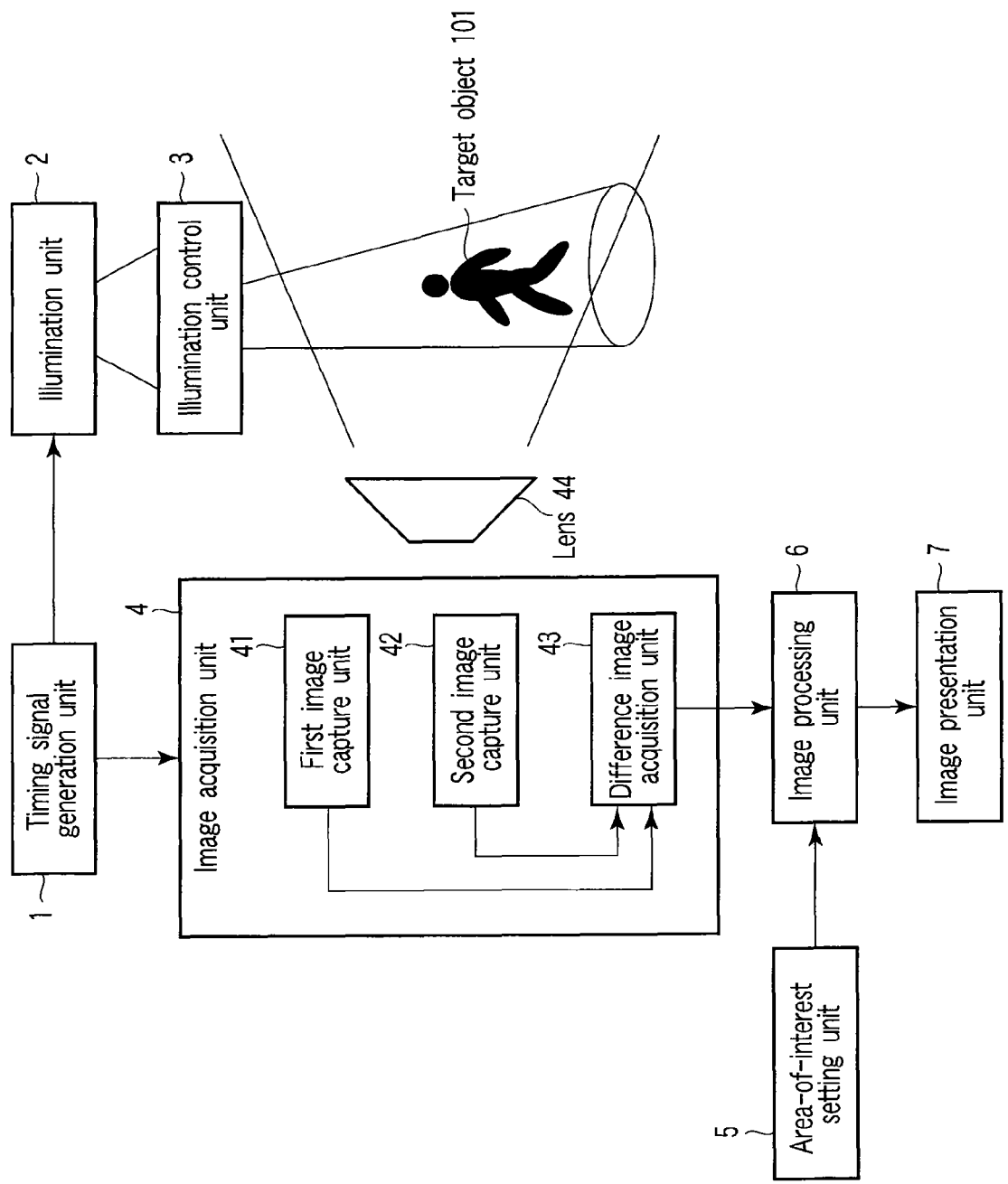
FIG. 1 is a block diagram showing an example of the arrangement of an image processing system according to a first embodiment.

The image processing system in FIG. 1 includes a timing signal generation unit 1, illumination unit 2, illumination control unit 3, image acquisition unit 4, area-of-interest setting unit 5, image processing unit 6, and image presentation unit 7. The image acquisition unit 4 comprises a first image capture unit 41, second image capture unit 42, difference image acquisition unit 43, and lens 44.

Figure 2:
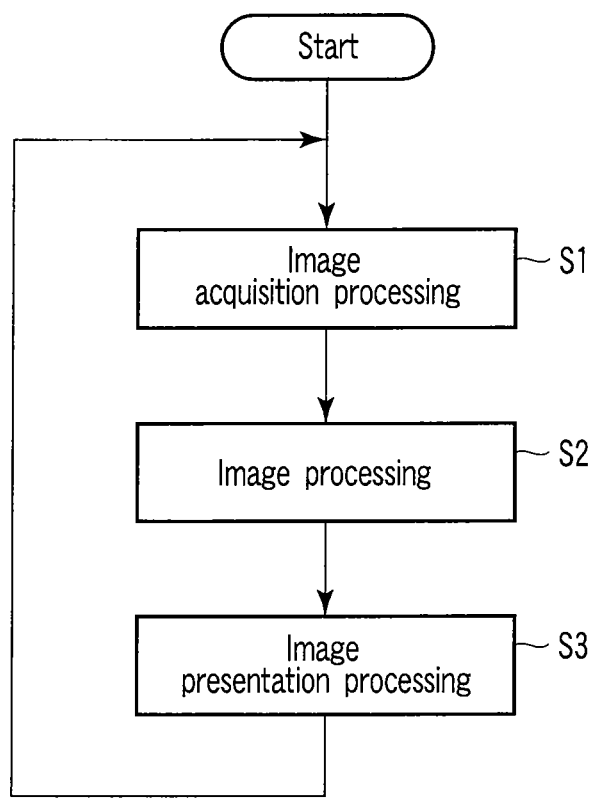
FIG. 2 is a flowchart showing an example of a procedure in the image processing system according to the embodiment.

As shown in FIG. 2, the operation of this system is roughly divided into three steps: image acquisition processing (step S1), image processing (step S2), and image presentation processing (step S3). The processing in steps S1 to S3 is repeatedly performed.

The timing signal generation unit 1 generates timing signals for controlling the illumination unit 2 and the image acquisition unit 4.

The illumination unit 2 illuminates a target area but is controlled by the illumination control unit 3 (e.g., a light-shielding plate) to illuminate only a proper portion (limited area) in a space.

The first image capture unit 41 of the image acquisition unit 4 acquires a first image which is an image during the emission of light from the illumination unit 2. The first image capture unit 41 captured, from a position different from the position of the illumination unit 2, an imaging area including the limited area illuminated by the illumination unit 2 or part of the area, to obtain the first image of the imaging area taken from the position different from the position of the illumination unit 2. Therefore, the overall first image or a partial image thereof includes an image of an area of interest which is part of the limited area illuminated by the illumination unit 2. That is, the first image capture unit 41 acquires the first image as an image of an imaging area which is focused so as to extract part of the limited area illuminated by the illumination unit 2.

The second image capture unit 42 of the image acquisition unit 4 acquires a second image which is an image when the illumination unit 2 emits no light. The second image capture unit 42 also acquires the second image by capturing the same imaging area as that of the first image capture unit 41. The second image is an image captured in the same manner as normal operation, i.e., a natural image.

The difference image acquisition unit 43 of the image acquisition unit 4 acquires a third image (i.e., a difference image) as the difference between the first and second images from the first and second images.

The difference image is obtained by capturing only reflected light of light emitted from the illumination unit 2.

The image acquisition unit 4 outputs the third image (difference image) and the second image (natural image).

The area-of-interest setting unit 5 sets an area in the image to which attention is to be paid in particular. The image processing unit 6 processes the second image on the basis of the information of the area of interest set in this case and the third image.

The image presentation unit 7 presents the processed second image.

The manner of actually arranging the illumination unit 2, the illumination control unit 3, and the image acquisition unit 4 will be described below.

FIG. 3 shows an example of how an illumination (the illumination unit 2 in FIG. 1), light-shielding plate (the illumination control unit 3 in FIG. 1), and camera (the image acquisition unit 4 in FIG. 1 or a camera having the functions of the first image capture unit 41 and second image capture unit 42 in FIG. 3) are arranged in a target space observed by the image processing system in FIG. 1. In the target space shown in FIG. 3, two pictures 102 and 103 and one sculpture 104 exist, and the illumination units 2 (illuminations 105 to 107 in FIG. 3) illuminate the neighborhoods of the respective exhibits.

The illuminations 105 and 106 placed near the pictures illuminate prohibited areas 108 and 109 in FIG. 3 in front of the pictures. Light from these illuminations is adjusted so as not to illuminate the pictures and the walls on which the pictures hang. However, that light is applied to a wall other than the wall on which the picture hangs and the floor. Some contrivance is required to control the illuminations to illuminate only such narrow areas. Light from the illumination can be applied to a rectangular area by making the illumination emit light, placing a light-shielding plate (not shown) at a position slightly separate from the illumination, and causing the light to pass through only a rectangular window formed in the light-shielding plate. With this arrangement, light can be applied to only desired positions.

Light is applied to a surrounding portion 111 of the sculpture in the form of a doughnut in FIG. 3. The illumination above the sculpture applies light through a light-shielding plate 110 in FIG. 3 which has a doughnut-like window, and hence the light is applied in the shape formed by hollowing out, from a cone, a cone which has the same height and a smaller base circle. Since the sculpture is located in the doughnut-like hole, no light is applied to the sculpture.

Such a target space is captured by a camera 112 in FIG. 3 from the font side.

The operation of the image acquisition unit 4 which operates in association with the operation of the illumination unit 2 will be described with reference to FIG. 4. There will be described how the third image (difference image) output from the image acquisition unit 4 becomes the image captured with only reflected light of light from the illumination unit 2.

Figure 4:
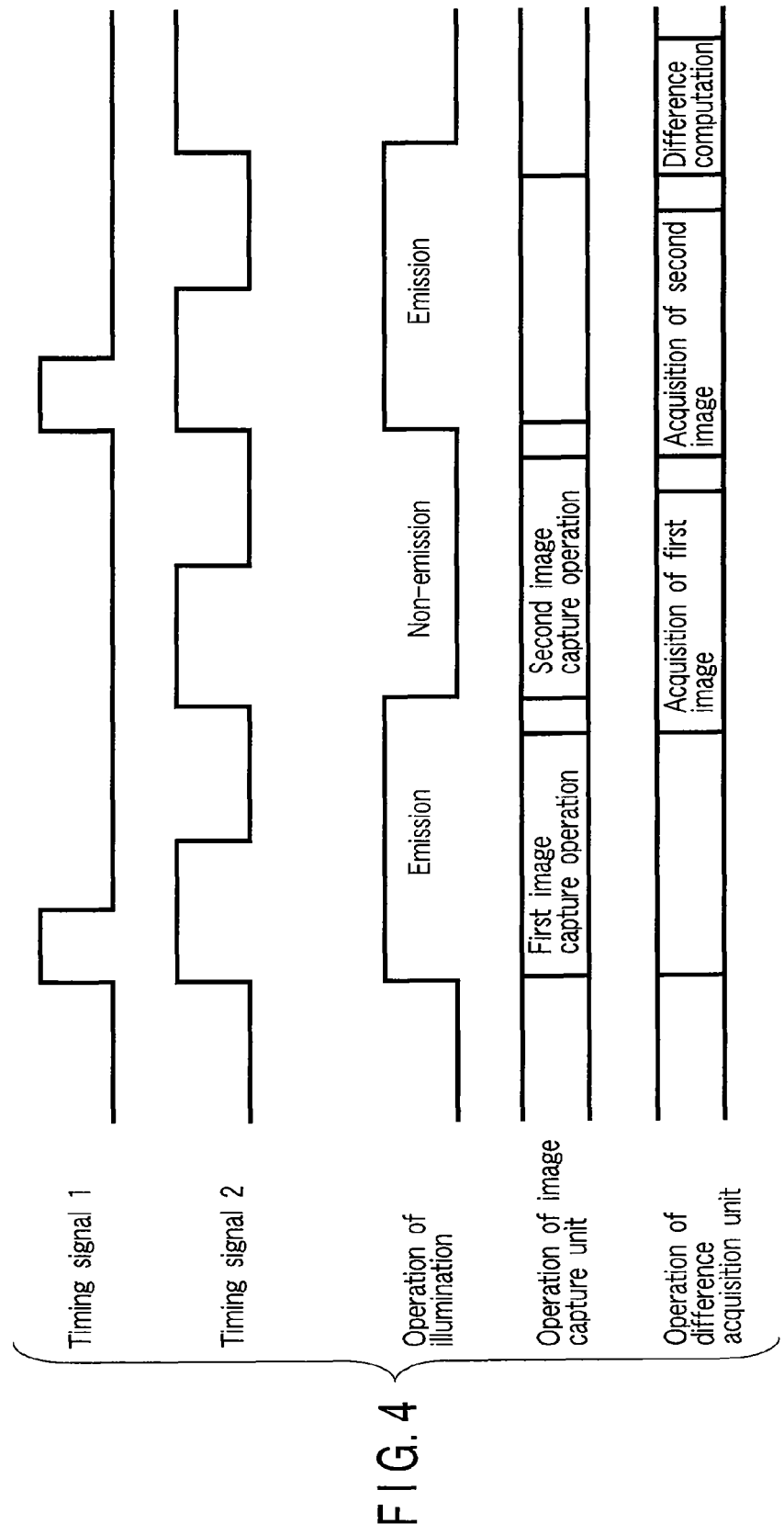
FIG. 4 is a timing chart showing an example of the operation timings of the illumination unit and image acquisition unit of the image processing system according to the embodiment.

Referring to FIG. 4, the timing signal generation unit 1 generates timing signals 1 and 2. Timing signal 1 provides the start timing of a series of cycles. Timing signal 2 provides the operation timing of the illumination unit 2 or image acquisition unit 4. In a series of 2 cycles, the illumination unit 2 emits light in the first cycle, and emits no light in the second cycle. The first image capture unit 41 obtains the first image by performing the first image capture operation in the first cycle of an emission period. The second image capture unit 42 obtains the second image by performing the second image capture operation in the second cycle of a non-emission period.

As the first image capture unit 41 and the second image capture unit 42, for example, CCD image sensors can be used. In this case, the CCD image sensors perform the first and second image capture operations in two consecutive frames to be captured.

The signal of a captured image is output in the image capture period of the next frame.

The difference image acquisition unit 43 sequentially acquires the first and second images, and computes the difference image by subtracting the second image from the first image. The third image obtained as this difference image is the image captured by using only the reflected light of light from the illumination unit 2. In other words, this image is captured in an environment in which there is no light source other than the illumination unit 2. Since these images are the images of two consecutive frames, there is almost no change in the target imaging area. Therefore, the first image differs from the second image only in that the portion illuminated by the illumination unit 2 is slightly bright. Obtaining the difference between the two images can extract only the slightly bright portion.

Figure 5:
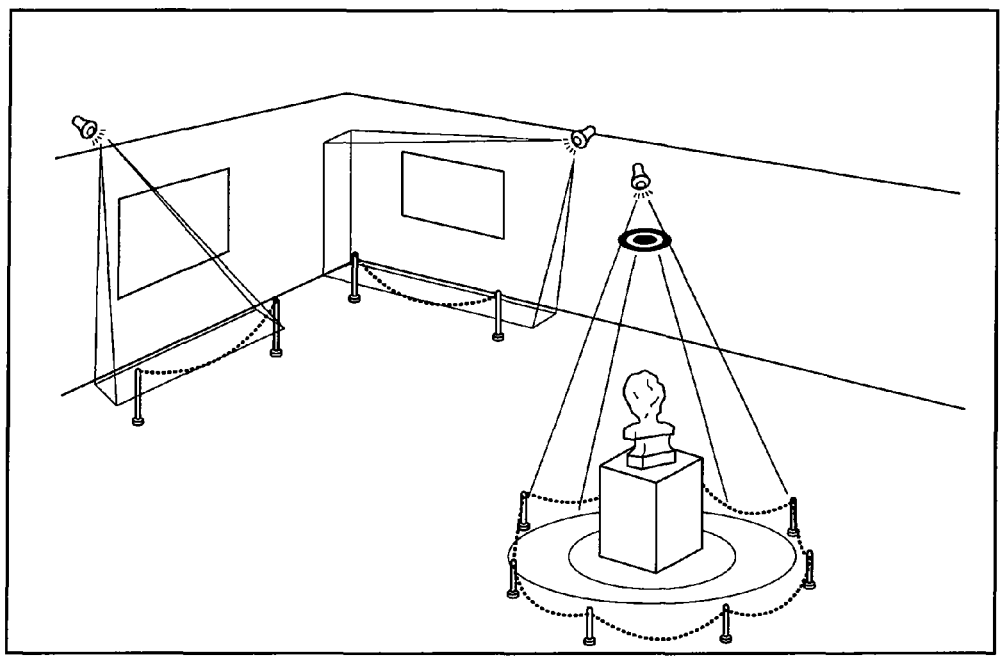
FIG. 5 is a view showing an example of a second image.
Figure 6:
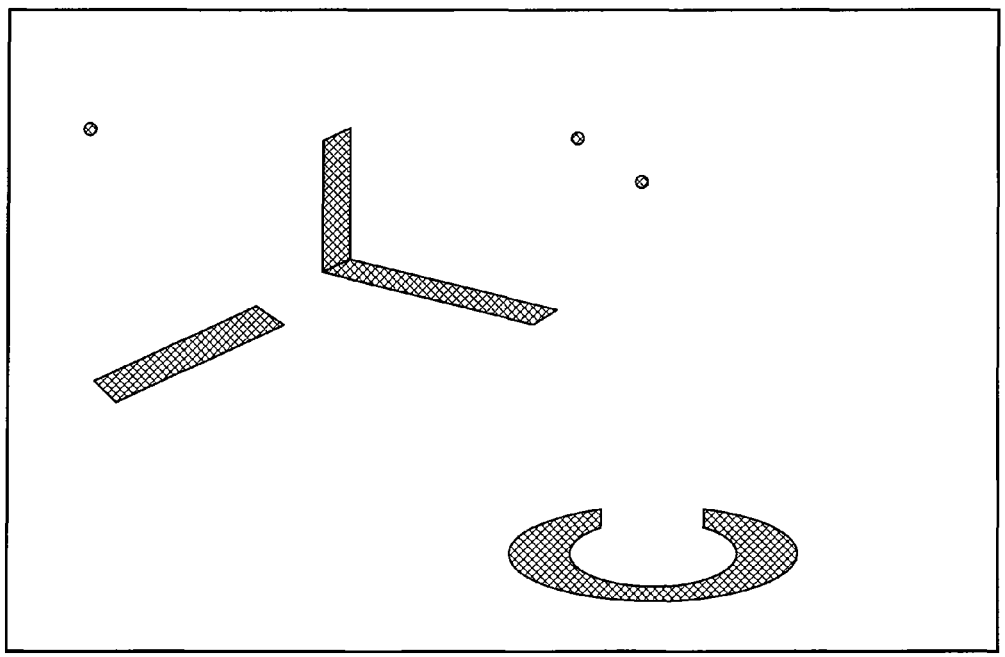
FIG. 6 is a view showing an example of a third image obtained in the case of FIG. 5.

In the third image obtained by capturing the space in which the exhibits are arranged as shown in FIG. 3, only illuminated portions of the floor and walls, other than the light sources of the illumination units 2, are imaged, and no other things are imaged. For example, FIG. 5 shows a generally captured natural image (second image). FIG. 6 shows a difference image (third image). Note that in an actual difference image, portions irradiated with light are "white", and a portion where nothing is imaged is "black". For the sake of convenience, however, in the image shown in FIG. 6, the black areas and the white area are expressed inversely. That is, the cross-hatched portions in FIG. 6 are those irradiated with light and imaged bright. Note that the small circles indicate that the light sources of the illumination units 2 are directly imaged.

Figure 7:
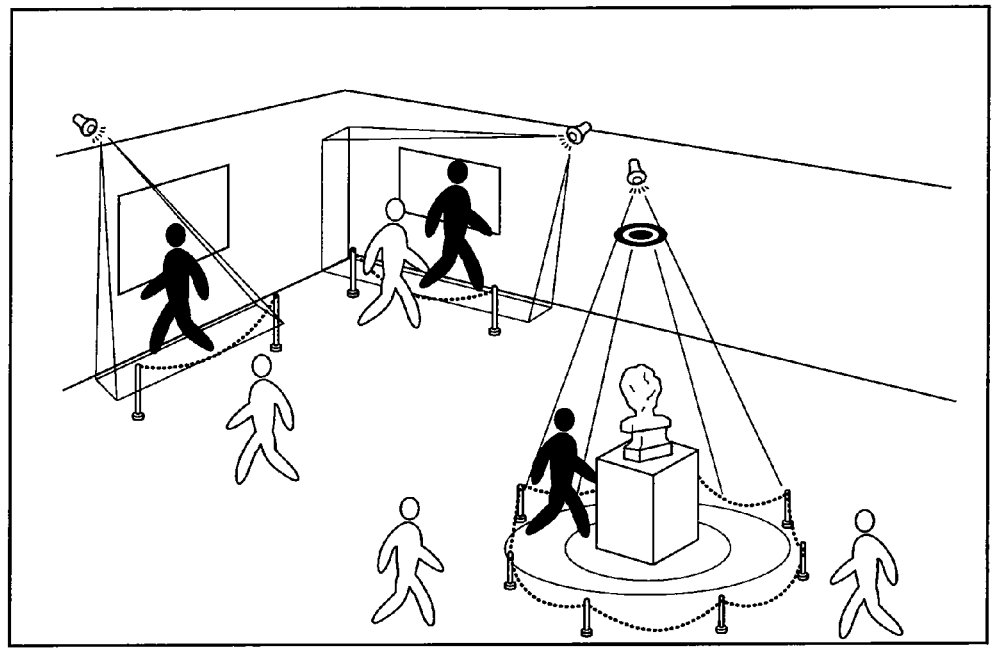
FIG. 7 is a view showing a case in which a plurality of persons exist at image capturing targets.
Figure 8:
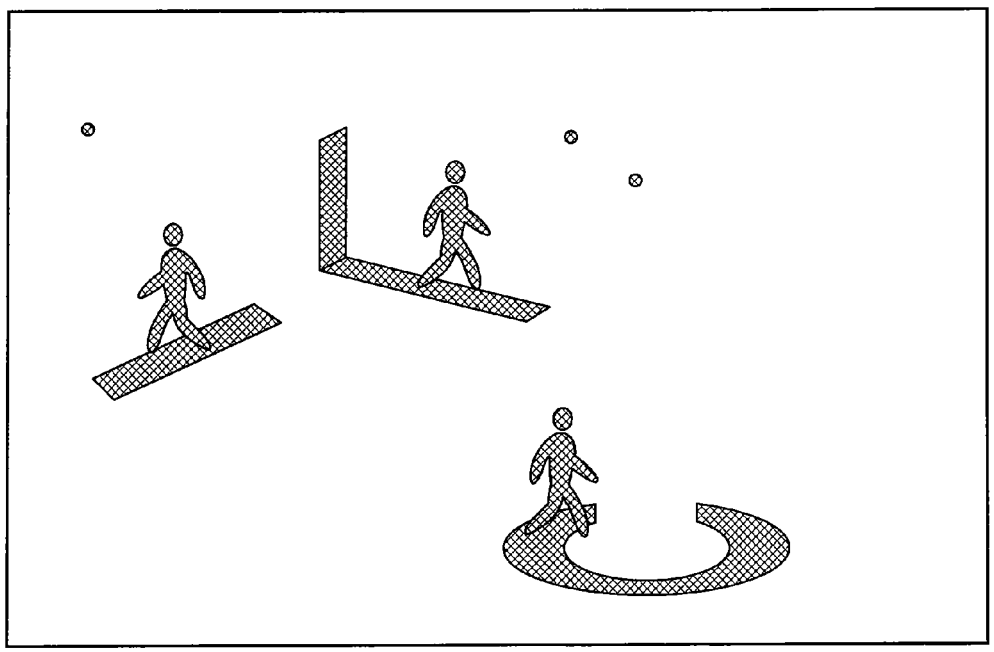
FIG. 8 is a view showing the third image obtained in the case of FIG. 7.

Consider a case in which a plurality of persons exist in the areas. Referring to FIG. 7, the persons represented by the hollow images are outside the prohibited areas, and no light from the illumination units 2 is applied to them. In contrast, the persons in black are inside the prohibited areas, and hence light from the illumination units 2 is applied to them. When the image acquisition unit 4 captures such a scene, only the things irradiated with light from the illumination units 2 are imaged in the third image (difference image). As exemplified by the third image in FIG. 8, the persons inside the prohibited areas are captured as images.

The area-of-interest setting unit 5 will be described next.

Figure 9:
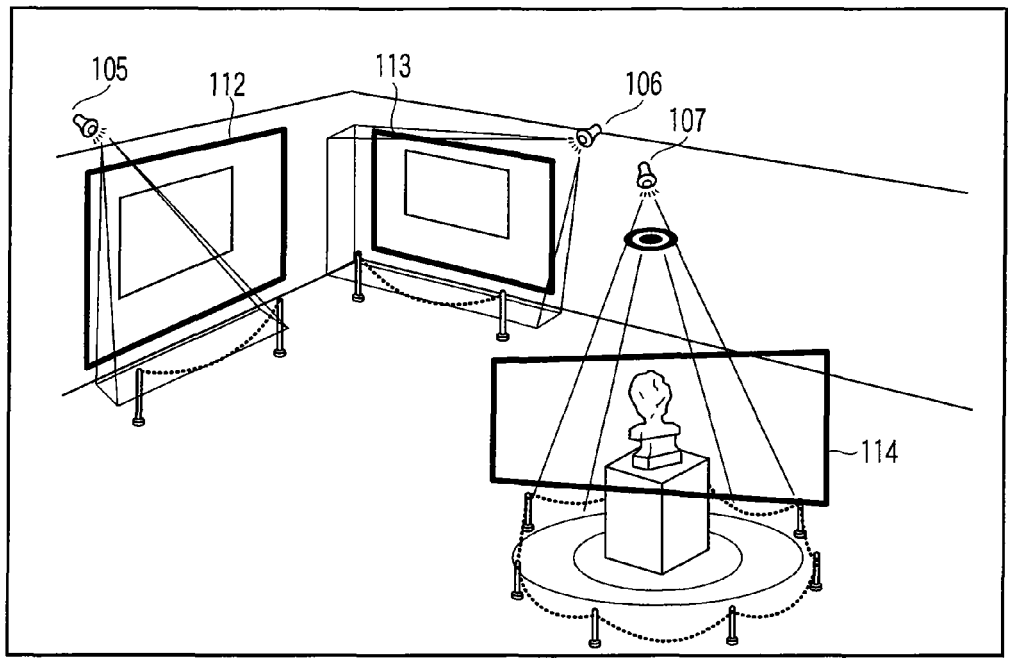
FIG. 9 is a view for explaining the setting of an area of interest.

Rectangles 112 to 114 drawn with the thick lines in FIG. 9 represent set areas of interest. It should be noted that the areas of interest are set, avoiding the portions irradiated with light from the illuminations 105 to 107 of the illumination units 2 in FIG. 9, such as the floor and the walls.

As shown in FIG. 9, in a case in which there are no persons in the prohibited areas, when only the areas of interest are extracted from the third image, nothing is imaged.

Figure 10:
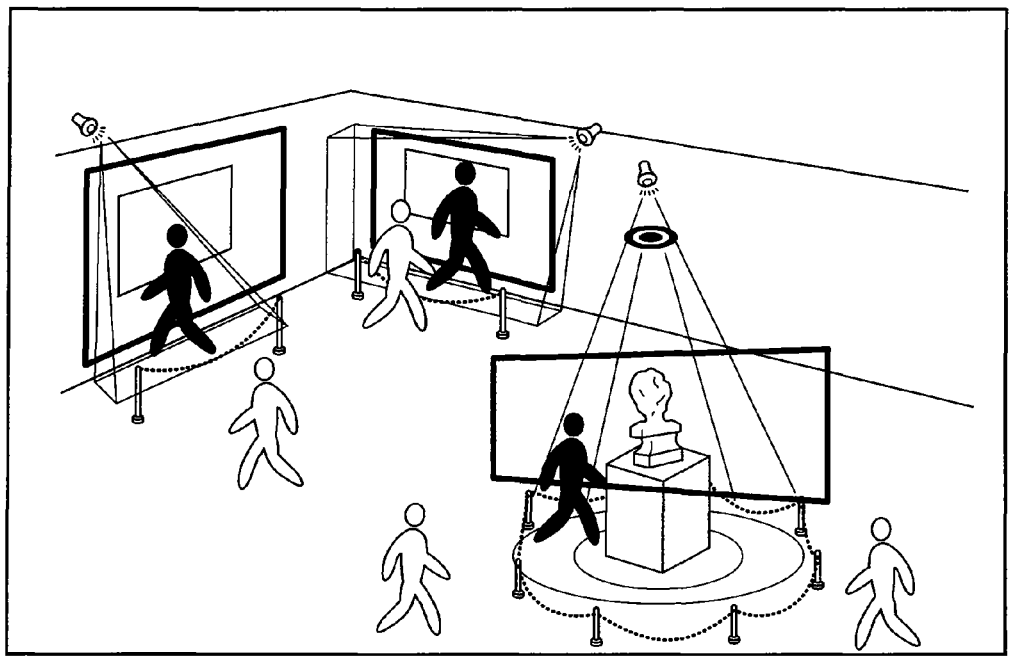
FIG. 10 is a view for explaining the setting of an area of interest.
Figure 11:
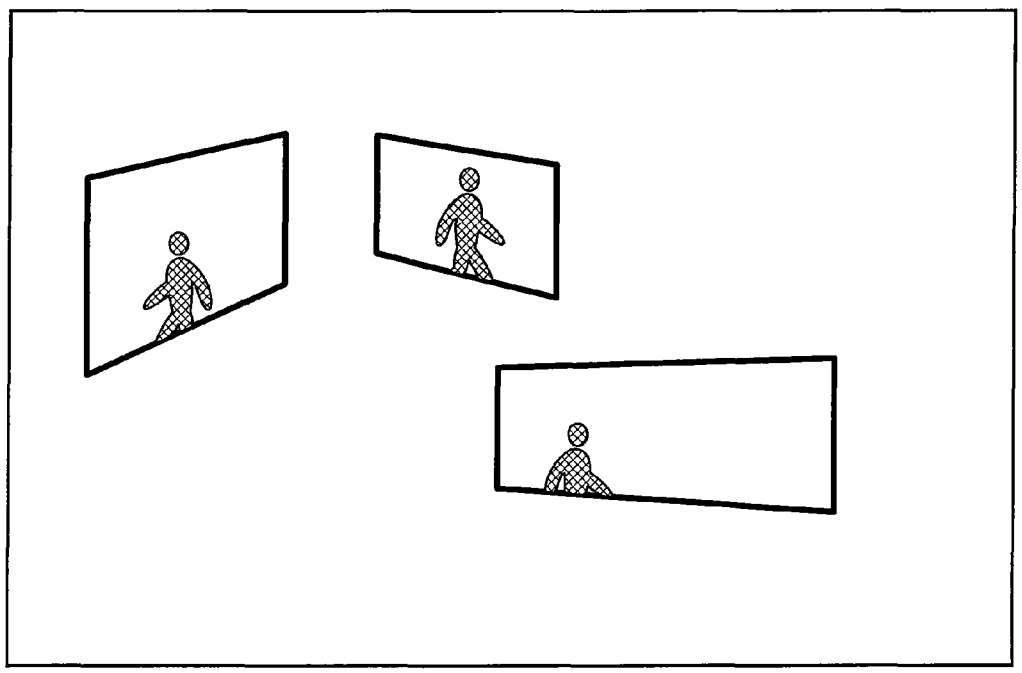
FIG. 11 is a view showing an example of the third image obtained by extracting only portions corresponding to areas of interest.

In contrast to this, as shown in FIG. 10, when there are persons in the prohibited areas, the persons inside the prohibited areas appear in the third image. FIG. 11 shows an example of the third image in this case.

Figure 12:
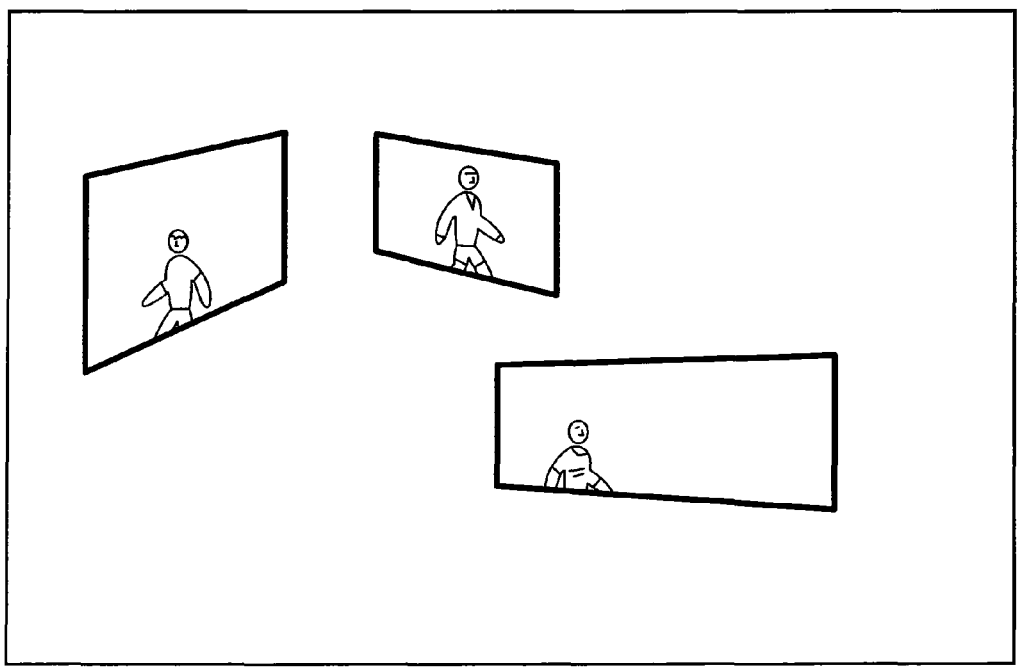
FIG. 12 is a view showing an example of the second image processed to extract only persons within prohibited areas and allow them to be seen.

The image processing unit 6 processes the second image (natural image) on the basis of the third image (difference image) and the areas of interest. First of all, the image processing unit 6 extracts only the images inside the areas of interest from the third image. The image processing unit 6 then uses the extracted images as masks and extracts only the areas of the masks from the second image. With this operation, as exemplified by FIG. 12, only the persons inside the prohibited areas can be seen as natural images.

FIG. 13 shows how a detection area is limited by an illumination (the illumination unit 2 in FIG. 1) which illuminates a limited area and an area of interest which is set in an image. As shown in FIG. 13, the detection area is the intersection portion between the area illuminated by the illumination unit 2 and the area of interest set inside the imaging area of the first and second image capture units 41 and 42 (i.e., inside the first and second images).

As described above, this embodiment can easily visualize an object inside a narrow detection area.

In addition, this embodiment allows to set a detection area with a high degree of freedom in an observation target area and effectively detect whether any object has entered the detection area. This makes it possible to generate and present an effective image which allows an observer to easily perform observation.

Furthermore, since a detection area can be set by using the camera (the camera having the first image capture unit 41 and the second image capture unit 42 in FIG. 1 or the image acquisition unit 4 in FIG. 1) and the illumination device (the illumination unit 2 or the illumination unit 2 and the illumination control unit 3 in FIG. 1), the detection area can easily be modified or changed.

Moreover, since distance images or the like are not used, this system can be implemented at a low cost. Even a plurality of detection areas can be set by using a plurality of illuminations and a plurality of areas of interest inside an image captured by one camera. This can also implement a low-cost system.

Variations of the above examples of the arrangements will be described below.

<Variation 1>

According to the above examples of the arrangements, a light-shielding plate having a hole of a specific shape is used as the illumination control unit 3. Using an LED illumination or the like other than such illumination control unit allows an LED itself to have strong light directivity. If the rectangular illumination unit 2 having LEDs with strong directivity arranged downward is prepared, a rectangular parallelepiped space having a surface corresponding to the size of the illumination portion is irradiated with light below the illumination unit 2. In this case, a lens which makes each LED have directivity is used as the illumination control unit 3.

Alternatively, it suffices to use a light source having strong directivity by itself like a laser light source. In addition, as an illumination, a visible light illumination or an invisible light illumination like a near infrared illumination can be used. Using a visible light illumination can make the illumination have its primary function of illuminating a corresponding area and make it noticeable that the place is being observed. In contrast, using an invisible light illumination makes it difficult to notice that the place is being observed.

<Variation 2>

According to the above examples of the arrangements, as the image acquisition unit 4, a CCD image sensor is used, and the difference image between the captured images of two consecutive frames as the first and second captured images is calculated. In general, a CCD image sensor converts light into charges by using a photoelectric conversion unit, transfers them to a charge transfer unit, and finally outputs the charges upon converting them into an voltage. In some cases, the voltage is A/D-converted, and the resultant digital data is output. Some CCD image sensor can move charges from the photoelectric conversion unit to the charge transfer unit via even-numbered lines and odd-numbered lines, separately. When such a CCD image sensor is used, controlling the sensor to alternately arrange first image information and second image information in the charge transfer unit makes it possible to simultaneously acquire the first and second images in a one-frame image. In this case, the CCD image sensor alternately outputs the first and second images on a line basis, and hence differential operation can be performed by using only a line buffer. This arrangement is disclosed in detail in JP-A H11-316645 (KOKAI).

In addition, a dedicated image sensor for capturing such a difference image can be used. The image sensor disclosed in JP-A 2005-175391 (KOKAI) and JP-A 2005-175392 (KOKAI) has one photoelectric conversion element and two charge storage units for each cell forming one pixel. The first charge storage unit stores charges obtained by photoelectric conversion at the time of emission. The second charge storage unit stores charges obtained by photoelectric conversion at the time of non-emission. At the time of output, this sensor can output a difference image via the subtraction circuit. The image sensor disclosed in these references separately has cells for acquiring color natural images in addition to cells for capturing this difference image, and hence can simultaneously acquire a difference image and a color image.

It is also possible to use a plurality of image sensors. The image acquisition unit 4 using a near infrared light source as an illumination uses a spectral means like a dichroic mirror to split light into visible light and near infrared light, and captures them by using dedicated image sensors, respectively. The image sensor which captures near infrared light obtains a difference image by performing image capturing twice. The image sensor which captures visible light acquires a natural image by normal operation.

<Variation 3>

According to the above examples of the arrangements, the second image (natural image) is processed from the set area of interest and the third image (difference image). In some cases, the first image may be processed. If an area itself to be captured is dark or light from the illumination unit 2 occupies most of the light illuminating a target area, the second image becomes dark, which is not an appropriate image. In such a case, processing and presenting the first image can present an eye-friendly image. In addition, it suffices to switch between processing the first image and processing the second image depending on an environmental state or an image state.

As a processing method, the method of displaying only persons who have entered areas of interest has been described. However, such a processing method is not always be the best method in consideration of observer's observation of a processed image. For example, there are available methods of enhancing and displaying only persons who have entered prohibited areas while displaying an entire natural image (second image). Such methods include, for example, a method of enclosing, with red frames, persons who have entered prohibited areas. Alternatively, it is possible to use a processing method of clearly displaying only persons who have entered prohibited areas while displaying an entire image with a slightly low luminance or a light color.

If there is no need to finally see any images, processing of the first and second images can be omitted. If, for example, it is only required to count the number of persons who have passed through given areas, objects existing in each area of interest are detected from the third image. When objects existing in each area of interest are detected, the number of objects is counted.

<Variation 4>

According to the above examples of the arrangements, an area (area of interest) to be observed is basically set as the intersecting portion between the area illuminated by the illumination unit 2 and the area from which an image or partial image is to be extracted. If an area of interest with a higher degree of freedom is to be set, a space can be defined by using another illumination.

For example, the arrangement shown in FIG. 1 further includes another illumination unit whose emission of light is controlled by a timing signal generated by the timing signal generation unit 1, and also includes another illumination control unit as needed. The other illumination unit is controlled by a timing signal generated by the timing signal generation unit 1 to emit light at a timing different from the timing at which light for acquiring the first image is emitted. In addition, an area in the space illuminated by the other illumination unit intersects an area in the space illuminated by the illumination unit 2. This arrangement further includes a third image capture unit which acquires a fourth image by capturing the same imaging area as those of the first and second image capture units 41 and 42.

Another illumination emits light at a timing different from the timing at which this illumination for acquiring the first image emits light, and the third image capture unit acquires the fourth image at this time. The fifth image is then acquired, which is the difference image obtained by subtracting the second image (natural image) from the fourth image. The fifth image is the image obtained by capturing only reflected light of light from the new illumination. When the image processing unit 6 extracts a portion which is imaged in both the third and fifth images, the extracted portion is an object existing in a smaller area which is further defined. Note that the first image capture unit 41 may also function as the third image capture unit.

In this manner, it is possible to set a more limited detection area with a higher degree of freedom.

<Variation 5>

According to the above examples of the arrangements, image capture is performed twice consecutively, and the resultant difference image is acquired. This operation, however, needs attention depending on the relationship between image capture intervals and variations in ambient light. If, for example, ambient light is general fluorescent light, the ambient light varies in brightness at a period of 100 Hz (Kanto area) or 120 Hz (Kansai area) in association with a power supply frequency. If image capture is performed twice at intervals and in durations irrelevant to this period, ambient light changes in intensity during the two image capture operations, and variation components of ambient light appear in the difference image. In this case, for example, setting the image capture duration to $1/100$ sec or $1/120$ sec or an integer multiple thereof will make the number of variable periods of ambient light in image capture durations remain the same. This makes the operation free from the influence of ambient light variations. In addition, setting the image capture intervals to $1/100$ sec or $1/120$ sec or an integer multiple thereof will make ambient light associated with two image capture operations have a uniform phase. This also makes the operation free from the influence of ambient light variations. As described above, in some cases, it is necessary to perform operation depending on variations in ambient light.

If ambient light has a very short period like light from an inverter luminescent lamp, the operation is not easily affected by ambient light variations. In contrast, assume that a general luminescent lamp is an ambient illumination, the image acquisition unit 4 repeatedly performs the first and second image capture operations at a very short period, and the differences between the resultant images are obtained. In this case as well, the above operation is not easily affected by ambient light variations. Using a sensor having two charge storage units in addition to one photoelectric conversion unit in the above cell makes it possible to perform such control relatively easily.

As described above, many variations are conceivable concerning this embodiment.

Second Embodiment

An image processing system according to the second embodiment of the present invention will be described.

In a normal situation, it is optimal to use the difference image between the two images acquired at two timings by causing the illumination unit 2 to intermittently emit light as in the first embodiment. However, it is not necessary to use any difference image as long as a predetermined condition is satisfied. The predetermined condition in this case is an environment in which not much sunlight enters and a case in which the light filling the environment does not include much near infrared components. More specifically, such environments include a place where there are few windows and many fluorescent illuminations.

The difference between the first and second embodiments will be mainly described below.

Figure 14:
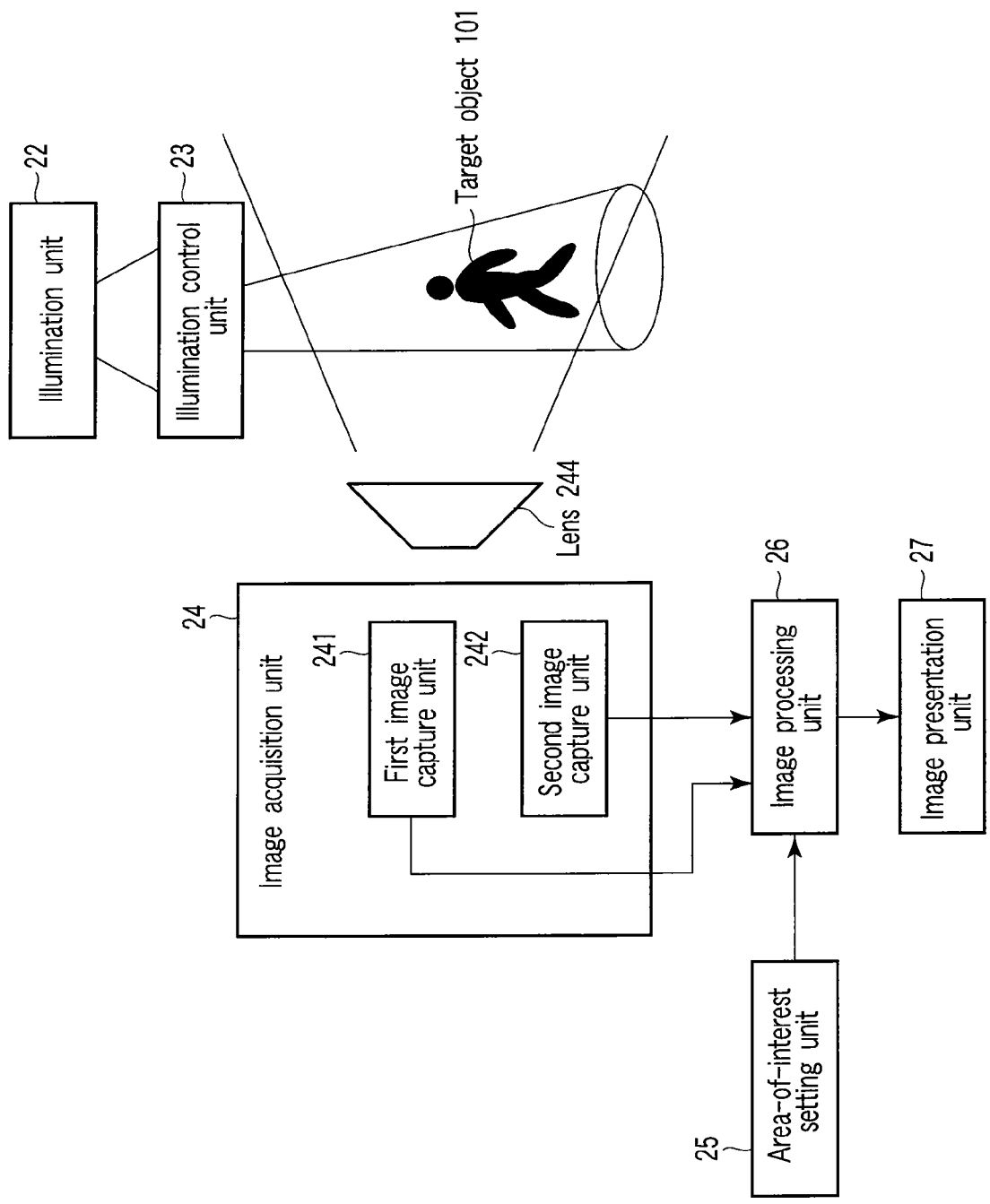
FIG. 14 is a block diagram showing another example of the arrangement of the image processing system according to a second embodiment.

Referring to FIG. 14, the image processing system comprises an illumination unit 22, illumination control unit 23, image acquisition unit 24, area-of-interest setting unit 25, image processing unit 26, and image presentation unit 27. The image acquisition unit 24 comprises a first image capture unit 241, second image capture unit 242, and lens 244.

The overall operation procedure of the image processing system in FIG. 14 is the same as that in FIG. 2.

In this image processing system, there is no need to make an illumination intermittently emit light, and hence the image acquisition unit 24 need not synchronize with the emission of light.

The illumination unit 22 emits near infrared light which is invisible light (may continuously emit light). The two image capture units 241 and 242 share one lens 244 and use dichroic mirrors to separate visible light from near infrared light.

The first image capture unit 241 is basically the same as the first image capture unit 41 in the first embodiment except that only near infrared light is captured.

The second image capture unit 242 is basically the same as the second image capture unit 42 in the first embodiment, and acquires a natural image.

The area-of-interest setting unit 25 has almost the same function as that of the area-of-interest setting unit 5 in the first embodiment.

The image processing unit 26 extracts only a portion corresponding to an area of interest from the first image captured by the first image capture unit 241, and processes the second image by using the extracted portion as a mask image, thereby presenting a natural image of an object irradiated with near infrared light.

This embodiment uses no difference image, and hence a near infrared component of ambient light is imaged on the second image even at a portion to which no near infrared light from the illumination unit 2 is applied. When the second image is to be processed, therefore, threshold processing with a relatively high threshold is preferably performed to inhibit the detection of an image with certain luminance. In this case, for example, only when a person enters a target area, an image of the person with a luminance exceeding the threshold is detected. Alternatively, it suffices to eliminate the influence of a near infrared light component of ambient light by performing the time difference processing of calculating the time difference between frames separated by a predetermined number of frames. In this case, when no person is imaged in the first frame but a person is imaged in the second frame, the image of the person imaged in the second frame is detected by performing the difference processing of subtracting the first frame from the second frame. Assume that a time difference is calculated. In this case, even if there is an area including a near infrared component having an influence higher than that of external light by a certain degree, the area can be regarded as a factor based on an environment as long as the luminance undergoes no change with time. It is also possible that when a person crosses such an area, the luminance of the near infrared component decreases, and the person can be detected.

The second embodiment is simpler in arrangement than the first embodiment, but is essentially the same as the first embodiment in that objects in limited spaces as areas defined by illuminations and images or partial images are detected.

In addition, many variations like those described in the first embodiment can be applied to the second embodiment in the same manner.

The respective functions described above can also be implemented by describing the functions as software and making a computer having proper mechanism process the software.

In addition, this embodiment can also be implemented as a program for making a computer execute a predetermined procedure, making the computer function as a predetermined means, or making the computer implement a predetermined function. In addition, the embodiment can be implemented as a computer-readable recording medium which records the program.

As described above, according to the first and second embodiments, it is possible to generate a narrow set area in a target space and reliably detect a change inside the area at a low cost.

What is claimed is:

1. An image processing system comprising:
    an illumination unit configured to emit near infrared light in an imaging area;
    a first capture unit configured to capture only a near infrared image of at least a part of the imaging area;
    a second capture unit configured to capture a natural image of at least the part of the imaging area;
    an area of interest setting unit configured to set an area of interest in the imaging area so as to define a detection area at an intersection between the imaging area illuminated by the illumination unit and an area inside the imaging area of the near infrared image and the natural image; and
    an image processing unit configured to extract an image inside the area of interest from the near infrared image, use the image extracted from the area of interest as a mask, and extract the mask from the natural image.

2. The system according to claim 1, further comprising an illumination control unit configured to adjust the near infrared light emitted from the illumination unit so as to illuminate a limited area in a space.

3. The system according to claim 1, wherein the illumination unit continuously emits the near infrared light.

4. The system according to claim 1, wherein the first and second image capture units share one lens.

5. The system according to claim 4, wherein the first and second image capture units further comprise dichroic mirrors to separate visible light from near infrared light.

6. The system according to claim 5, wherein the image processing unit performs threshold processing for the natural image to remove an influence of a near infrared component of ambient light, and process the natural image.

7. The system according to claim 1, wherein the first and second capture units capture the near infrared and natural images from a common position that is different from a position of the illumination unit.

8. An image processing system comprising:
    an illumination unit;
    an illumination control unit configured to adjust light emitted from the illumination unit so as to illuminate a limited area in a space;
    a first image capturing unit configured to capture a first image of an imaging area including the limited area or part of the limited area, the first image being formed by reflected light of the light emitted from the illumination unit and taken from a position different from a position of the illumination unit;
    a second image capturing unit configured to capture a second image which is a natural image of the imaging area and is taken from the position of the first image;
    an area of interest setting unit configured to set an area of interest in the imaging area so as to define a detection area at an intersection between the imaging area illuminated by the illumination unit and an area inside the imaging area of the first image and the second image; and
    an image processing unit configured to extract an image inside the area of interest from the first image, use the extracted image as a mask, and extract the mask from the second image.

9. The system according to claim 8, wherein
the illumination unit emits near infrared light, and
the image processing unit performs threshold processing for the second image to remove an influence of a near infrared component of ambient light, and process the second image.

10. The system according to claim 8, wherein
the illumination unit emits near infrared light, and
the image processing unit performs time difference processing for the second image to remove an influence of a near infrared component of ambient light, and process the second image.

11. An image acquisition method for an image processing system including an illumination unit and an illumination control unit configured to adjust light emitted from the illumination unit so as to illuminate a limited area in a space, the method comprising:

capturing a first image of an imaging area including the limited area or part of the limited area, the first image being formed by reflected light of the light emitted from the illumination unit and taken from a position different from a position of the illumination unit;

capturing a second image which is a natural image of the imaging area and is taken from the position of the first image;

setting an area of interest in the imaging area so as to define a detection area at an intersection between the limited area illuminated by the illumination unit and an area inside the imaging area of the first image and the second image; and extracting an image inside the area of interest from the first image, using the extracted image as a mask, and extracting the area of the mask from the second image.

* * * * *